(12) United States Patent
Shahzad et al.

(10) Patent No.: US 12,020,199 B2
(45) Date of Patent: Jun. 25, 2024

(54) METHOD AND APPARATUS FOR TRACKING, DAMAGE DETECTION AND CLASSIFICATION OF A SHIPPING OBJECT USING 3D SCANNING

(71) Applicant: Mettler-Toledo GmbH, Greifensee (CH)

(72) Inventors: Aamir Shahzad, Oslo (NO); Michael Heidingsfelder, Kiawah Island, SC (US); Eivind Kvedalen, Oslo (NO)

(73) Assignee: Mettler-Toledo GmbH, Greifensee (CH)

( * ) Notice: Subject to any disclaimer, the term of this patent is extended or adjusted under 35 U.S.C. 154(b) by 473 days.

(21) Appl. No.: 17/303,237

(22) Filed: May 25, 2021

(65) Prior Publication Data

US 2021/0374664 A1    Dec. 2, 2021

(30) Foreign Application Priority Data

May 27, 2020   (EP) .................................... 20176751

(51) Int. Cl.
| | |
|---|---|
| *G06Q 10/0833* | (2023.01) |
| *G01S 17/66* | (2006.01) |
| *G01S 17/87* | (2020.01) |
| *G01S 17/89* | (2020.01) |
| *G06F 16/903* | (2019.01) |
| *G06T 7/00* | (2017.01) |
| *G06T 17/00* | (2006.01) |

(52) U.S. Cl.
CPC ... *G06Q 10/0833* (2013.01); *G06F 16/90335* (2019.01); *G06T 7/0004* (2013.01); *G06T 17/00* (2013.01)

(58) Field of Classification Search
CPC .......................... G06T 7/004; G08B 13/19608
See application file for complete search history.

(56) References Cited

U.S. PATENT DOCUMENTS

| | | | |
|---|---|---|---|
| 10,204,448 B2 | 2/2019 | Hazeghi et al. | |
| 10,337,855 B2 | 7/2019 | Sorensen et al. | |
| 10,579,875 B2 * | 3/2020 | Dal Mutto | ............. G06N 3/045 |
| 10,691,979 B2 | 6/2020 | Dal Mutto et al. | |
| 2014/0192050 A1 | 7/2014 | Qiu et al. | |
| 2017/0227674 A1 * | 8/2017 | Sorensen | ............. G01B 11/005 |
| 2020/0057160 A1 | 2/2020 | Li et al. | |
| 2020/0386862 A1 | 12/2020 | Cop et al. | |

FOREIGN PATENT DOCUMENTS

KR    101714701 B1 *   6/2015   ............. G01B 11/00

* cited by examiner

*Primary Examiner* — Bobbak Safaipour
*Assistant Examiner* — Ashley L. Hytrek
(74) *Attorney, Agent, or Firm* — Standley Law Group LLP; Jeffrey S. Standley; Adam J. Smith

(57) ABSTRACT

A method, an apparatus and a computer program are provided for tracking a shipping object that has been selected from a stock of objects. The shipping object is subjected to a 3D scanning as it is being transported along a transport path from a first location to a second location distant from the first location.

16 Claims, 2 Drawing Sheets

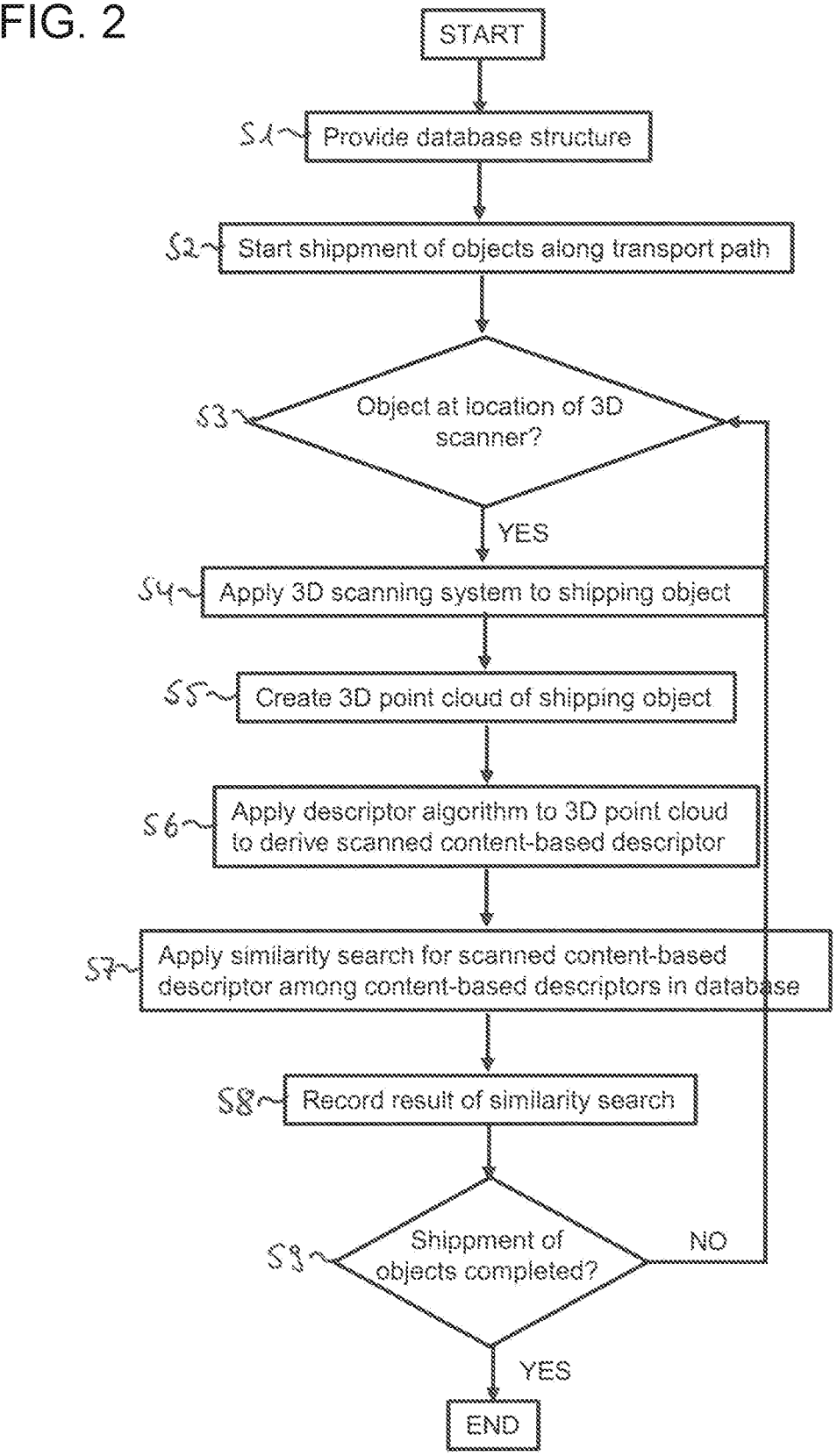

METHOD AND APPARATUS FOR TRACKING, DAMAGE DETECTION AND CLASSIFICATION OF A SHIPPING OBJECT USING 3D SCANNING

CROSS-REFERENCE TO RELATED APPLICATIONS

This application claims the benefit of priority to European patent application EP 20176751.4, filed on 27 May 2020, which is incorporated by reference as if fully recited herein.

TECHNICAL FIELD

The present invention relates to a method, an apparatus and a computer program for tracking a shipping object selected from a stock of objects, the shipping object being transported along a transport path from a first location to a second location distant from the first location.

BACKGROUND ART

Shipping objects can be lost or damaged in transport. The ability to track objects along their transport path is therefore important. If an object is lost, for example due to theft or since it was shipped by mistake to a different location than intended, its last known location must be established and proven. Furthermore, if an object was damaged during transport, the last location passed by the object in an undamaged condition as well as the first location where the object arrived in a damaged condition must be found and documented. These are important aspects for the search of a lost object and for settling liability disputes and insurance claims.

Methods for tracking and tracing require the identification of the shipping object. Conventional methods include barcoding and radio-frequency identification (RFID). With the rise of three-dimensional (3D) scanning technologies (see e.g. U.S. Pat. No. 10,204,448 B2, WO 2018/195996 A1), 3D imaging has been applied to identify objects. For example, US 2019/0108396 A1 discloses the application of 3D scanning to identify an object, e.g. in a retail environment, and the retrieval of metadata corresponding to the object, e.g. its price, from a database.

The application of 3D scanning systems to tracking and tracing is disclosed, e.g., in EP 3 203 264 A1 in the context of using so-called dimensioning systems. These systems employ 3D scanning technology to create a 3D model of surface points of shipping objects. Based on this 3D model, two-dimensional images from a desired viewing angle can be produced on demand to document the appearance of the shipping object at the time the scan was taken. These two-dimensional images may be recorded together with a time stamp and may be used for the search of a lost object, to document when an object was seen for the last time or when an object was damaged for the first time. However, the evaluation of such a tracking record of a shipping object is time consuming.

In the light of these problems in the prior art it is the object of the present invention to present a method, a system and a computer program for tracking a shipping object selected from a stock of objects which is less time consuming.

SUMMARY

According to a first aspect of the present invention, this object is attained by a method of tracking a shipping object selected from a stock of objects, the shipping object being transported along a transport path from a first location to a second location distant from the first location, the method comprising the following steps:
  providing a database structure, wherein for each object of the stock a content-based descriptor of a three-dimensional (3D) point cloud representation of the object is attributed to the object, the content-based descriptor being derived by a predefined descriptor algorithm,
  applying, at each of a plurality of locations along the path, a three-dimensional (3D) scanning system to the shipping object, the three-dimensional (3D) scanning system being operative to create for each of the plurality of locations a scanned three-dimensional (3D) point cloud of at least a region of an outer surface of the shipping object,
  applying the descriptor algorithm to each of the scanned three-dimensional (3D) point clouds to thereby derive a scanned content-based descriptor associated with the respective location,
  performing, for each of the plurality of locations, a similarity search between the scanned content-based descriptor associated with the respective location and the content-based descriptors in the database structure in accordance with a predefined similarity search algorithm, and
  maintaining a record of the results of the similarity search for each of the plurality of locations along the transport path.

The record of the results of the similarity search allows a quick retrieval of the shipping history of each object of the stock.

According to the first aspect of the present invention, there is given a stock of objects, e.g. objects stored in a warehouse. The objects of the stock are to be transported from a first location to a distant second location along a transport path. The first location and the second location may be both locations inside a warehouse. Alternatively, the first location may be at the side of a sender of the object, e.g. at a warehouse, and the second location may be at the side of a receiver, e.g. a customer who has ordered an object of the stock.

The method according to the first aspect of the present invention comprises providing a database structure, wherein for each object of the stock a content-based descriptor of a 3D point cloud representation of the object is attributed to the object, the content-based descriptor being derived by a predefined descriptor algorithm. A 3D point cloud is a set of data points in space. A 3D point cloud representation of an object is a virtual 3D model comprising a set of three-dimensional data points representative of the outer surface of the object.

The 3D point cloud representation may be created by applying a 3D scanning system to the shipping object. The 3D scanning system may comprise a light detection and ranging (LIDAR) system. The 3D scanning system may be located along the transport path. For example, it may be located at the first location. However, the 3D scanning system may be located at a location which is not along the transport path, and the objects of the stock may be scanned at this location. The 3D point cloud representation of the objects of the stock may also be created using other approaches different from 3D scanning.

A predefined descriptor algorithm is than applied to the 3D point cloud representation of each object in the stock to derive a content-based descriptor, which is than attributed to the respective object to create the database structure. The descriptor algorithm may be applied by using data processing means, e.g. a CPU. The content-based descriptor may be represented in the form of a multidimensional feature vector. The database structure may be of the form (object 1, descriptor 1; object 2, descriptor 2; ...; object N, descriptor N), i.e. descriptor k is associated to object k of the stock.

The shipping object is shipped along its transport path. The method further comprises applying, at a plurality of locations along the transport path, a 3D scanning system to the shipping object. The 3D scanning system may comprise a light detection and ranging (LIDAR) system. In its most basic form of the method according the present invention a 3D scanning system is applied at one single location along the path, e.g. the second location. However, the plurality of locations may also comprise two locations. For example, the 3D scanning system may be applied at the first location and at the second location. The 3D scanning system may also be applied to the shipping object at three, four or more locations along the transport path.

The 3D scanning system may comprise a single 3D scanning system that may be moved along the transport path. The 3D scanning system may also comprise a plurality of 3D scanning systems, each of the plurality of scanning systems being stationary at one of the plurality of locations along the transport path.

The 3D scanning system is operative to create for each of the plurality of locations a scanned 3D point cloud of at least a region of an outer surface of the shipping object. When the shipping object is e.g. transported on a conveyor belt, it may not be possible to scan the surface of the shipping object, which faces the conveyor belt, and this surface is not taken into account in the construction of the scanned 3D point cloud.

Once the scanned 3D point cloud of the shipping object at a respective location is created, the descriptor algorithm is applied to the scanned 3D point cloud to derive a scanned content-based descriptor associated with the respective location. The descriptor algorithm may be applied by using data processing means, e.g. a CPU. The descriptor algorithm is the same algorithm used for deriving the content-based descriptors in the database. The scanned content-based descriptor may be stored in memory means. The scanned content-based descriptor may be a multidimensional feature vector.

Then, a similarity search between the scanned content-based descriptor associated with the respective location and the content-based descriptors in the database structure is performed in accordance with a predefined similarity search algorithm. To this end, data processing mean, e.g. a CPU, may be used. In this way, one or more content-based descriptors in the database structure which are characterized as "similar" according to some definition as explained below may be identified. The identified content-based descriptors are associated with objects of the stock, and in this way a relationship between the scanned shipping object and one or several of the objects of the stock may be established. For example, in the case that one single object of the stock is identified by the similarity search algorithm, the identity of the shipping object may be established.

For each of the plurality of locations along the transport path the result of the similarity search is recorded in a record. In this way a record of the results of the similarity search may be maintained. This record allows to trace and track the object along its path of transport, as it is further specified below.

Preferred embodiments of the invention are based on object recognition and classification of the objects using LIDAR point clouds by means of machine learning. This implies preferably the recognition of different types of shipments based on distinct features and automatically detecting and grouping different types of shipments.

The method may in particular include the steps of:
1. collecting a dataset of samples, i.e. point clouds of objects
2. feature extraction—extracting the features from the point clouds associated with a particular object
3. Segmentation
4. object recognition.

Specifically, in feature extraction grouping of points helps to detect a certain type of point based on attributes (e.g. geometry, color, intensity, point density, etc.) which can be derived from the point cloud data.

Segmentation specifically makes use of grouping of points based on attributes into a segment or an object.

Object recognition is specifically carried out by performing analyses with the results of feature extraction and segmentation with given constraints and rules based on prior knowledge.

In one embodiment of the method according to the present invention the application of the 3D scanning system may comprise scanning the shipping object from a plurality of different directions, and the creation of the scanned 3D point cloud may comprise creating, for each of the plurality of scans, a first 3D point cloud, extracting, for each of the plurality of first 3D point clouds, a feature in accordance with a predefined extraction algorithm, and using the extracted features of the plurality of first 3D point clouds for registration of the scanned 3D point cloud of the shipping object in accordance with a predefined registration algorithm. In this way, a 3D point cloud representation of a large region of the surface of the object may be created, and even a 3D point cloud representation of the whole surface of the object may be created. Data processing means, e.g. a CPU, may be used for the application of the extraction algorithm and/or the application of the registration algorithm. The feature may be a geometric feature.

In one embodiment of the method according to the present invention the similarity search algorithm may be configured to compute a distance between the scanned content-based descriptor and the content-based descriptors in the database structure using a predefined metric.

When the content-based descriptor is in the form of a multidimensional feature vector, the metric may be a vector norm. For example, a modified Euclidean distance defined by the equation $$d_2^S(f, f') = \sqrt{\sum_{i=1}^{N} \sum_{j=1}^{N} s_{ij}(f_i - f_i')(f_j - f_j')}$$

may be used, where $f_i$, $f_i'$ are the vector components of the feature vectors $f$, $f'$ and $s_{ij}$ are the components of S which is a positive definite N×N matrix. The similarity search algorithm may search for the content-based descriptor in the database for which the distance to the scanned content-based descriptor is minimal and thereby identify a "similar" content-based descriptor.

The result of the similarity search may comprise information whether the scanned object corresponds to one of the objects of the stock. For example, it may be defined that the scanned object corresponds to one of the objects of the stock when the distance between the scanned content-based descriptor and the content-based descriptor associated to the one object of the stock is smaller than a first value within a given norm. For example, when $f_s$ is the feature vector representing the scanned content-based descriptor and $d_2^S(f_s, f_k)$ is minimal (e.g. $d_2^S(f_s, f_k) < \varepsilon$ for some $\varepsilon > 0$) for the feature vector $f_k$ representing a content-based descriptor in the database attributed to the object k, the shipping object is identified with the object k. This information may be of importance when the shipping object is not provided with any other identification information, like a shipping address or a barcode, or in case that this information was lost.

Additionally or alternatively, the result of the similarity search may comprise information whether the shipping object is damaged. For example, it may be defined that a shipping object is damaged when it is established that the object corresponds to one of the objects of the stock wherein the surface of the shipping object differs from the surface of this object of the stock in some predetermined way. For example, the distance between the scanned content-based descriptor and the content-based descriptor associated to the one object of the stock may be smaller than a first value and larger than a second value within a given norm.

The record of the result of the similarity search may be used for various trace and track applications. In one embodiment, maintaining the record of the results of the similarity search may comprise recording of the time and the location of the application of the 3D scanning system along the transport path. For example, the record may be of the form (object=product name, location=start, time=$t_0$; object=product name, location=$x_1$, time=$t_1$). This may allow to narrow down the area where a shipping object got lost. For example, the 3D scanning system may be applied at N locations along the transport path. Then, the record may comprise information that a certain shipping object was scanned at the location $x_n$ at a certain time. When the shipping object is not scanned at a later time at a subsequent location $x_{n+1}$, one can understand from the record that the object must have gotten lost between the location $x_n$ and the location $x_{n+1}$.

Additionally or alternatively, maintaining the record of the results of the similarity search may comprise recording of the information whether the object is damaged. Preferably, this information is recorded with the time and the location of the application of the 3D scanning system. In this way, it is possible to identify the last location where the object was recorded as not damaged and the first location where the object was recorded as damaged.

The content-based descriptor may be any descriptor that may be derived by a descriptor algorithm. In one example of the method according to the present invention the content-based descriptor may be based on a geometric feature of the 3D point cloud.

In one embodiment of the method according to the present invention, the 3D point cloud representation of the objects of the stock and/or the scanned 3D point clouds may be classified by using artificial intelligence, in particular by using a convolutional neural network. If both, the 3D point cloud representations of the objects of the stock and the scanned 3D point clouds are classified, the similarity search may contain filtering. I.e., for a given scanned content-based descriptor, which is classified in a certain class (e.g., the scanned content-based descriptor is derived from the 3D point cloud representation of a motorbike and is classified as such), the similarity search is performed only between those content-based descriptors in the database which are in the same class as the scanned content-based descriptor (i.e., all those content-based descriptors in the database derived from a 3D point cloud representation of a motorbike and classified as such). In this way, a speed-up of the similarity search algorithm compared to a case without filtering can be achieved.

According to a second aspect of the present invention there is provided a system for tracking a shipping object selected from a stock of objects, the shipping object being transported along a transport path from a first location to a second location distant from the first location, the system comprising:
  a database comprising a database structure, wherein for each object of the stock a content-based descriptor of a three-dimensional (3D) point cloud representation of the object is attributed to the object, the content-based descriptor being derived by a predefined descriptor algorithm,
  a three-dimensional (3D) scanning system, the three-dimensional (3D) scanning system being applicable to the shipping object at each of a plurality of locations along the qtransport path, the three-dimensional (3D) scanning system being operative to create for each of the plurality of locations a scanned three-dimensional (3D) point cloud of at least a region of an outer surface of the shipping object,
  data processing means in communication with the database and the three-dimensional (3D) scanning system, the data processing means being operative to apply the descriptor algorithm to each of the scanned three-dimensional (3D) point clouds to thereby derive a scanned content-based descriptor associated with the respective location and to perform, for each of the plurality of locations, a similarity search between the scanned content-based descriptor associated with the respective location and the content-based descriptors in the database structure in accordance with a predefined similarity search algorithm,
  means for maintaining a record of the results of the similarity search for each of the plurality of locations along the transport path.

According to one embodiment of the present invention, the 3D scanning system may comprise a light detection and ranging (LIDAR) system. LIDAR is a remote sensing technology that measures distance by illuminating a target object with a laser and analyzing the reflected light. The reflected light returning from the object may be optically focused onto light sensors. At discrete points in time, based on the time delay or the phase shift between the emitted light and the received light, the distance travelled by the light may be calculated. The travel distance together with the known spatial direction of the laser beam at that same point in time allows to determine the position of the point of incidence on the object surface in spatial coordinates. Furthermore, the intensity data of the reflected light may be used to tint the surface of the 3D point cloud in monochromatic tones corresponding to the intensity levels.

The shipping object may be transported on a conveyor belt or on a forklift along its transport path.

According to a third aspect of the present invention, there is provided a computer program for tracking a shipping object selected from a stock of objects, the shipping object being transported along a transport path from a first location to a second location distant from the first location, the computer program comprising instructions which, when the program is executed by a computer, cause the computer to carry out the following steps:
  providing a database structure, wherein for each object of the stock a content-based descriptor of a three-dimensional (3D) point cloud representation of the object is attributed to the object, the content-based descriptor being derived by a predefined descriptor algorithm, retrieving scanning data obtained by applying a three-dimensional (3D) scanning system to a shipping object at each of a plurality of locations along the transport path and creating, for each of the plurality of locations, a scanned three-dimensional (3D) point cloud of at least a region of an outer surface of the shipping object from the retrieved scanning data.

applying the descriptor algorithm to each of the scanned three-dimensional (3D) point clouds to thereby derive a scanned content-based descriptor associated with the respective location, performing, for each of the plurality of locations, a similarity search between the scanned content-based descriptor associated with the respective location and the content-based descriptors in the database structure in accordance with a predefined similarity search algorithm, and maintaining a record of the results of the similarity search for each of the plurality of locations.

According to a fourth aspect of the present invention, there is provided a data carrier having stored thereon the computer program defined above.

BRIEF DESCRIPTION OF THE DRAWINGS

In the following description, the invention will be described in greater detail by way of example, with reference to the drawings, wherein identical parts are identified by identical reference numbers and wherein:

FIG. 2 is a flow chart of an embodiment of a method for tracking an object according to the present invention.

DETAILED DESCRIPTION

Figure 1:
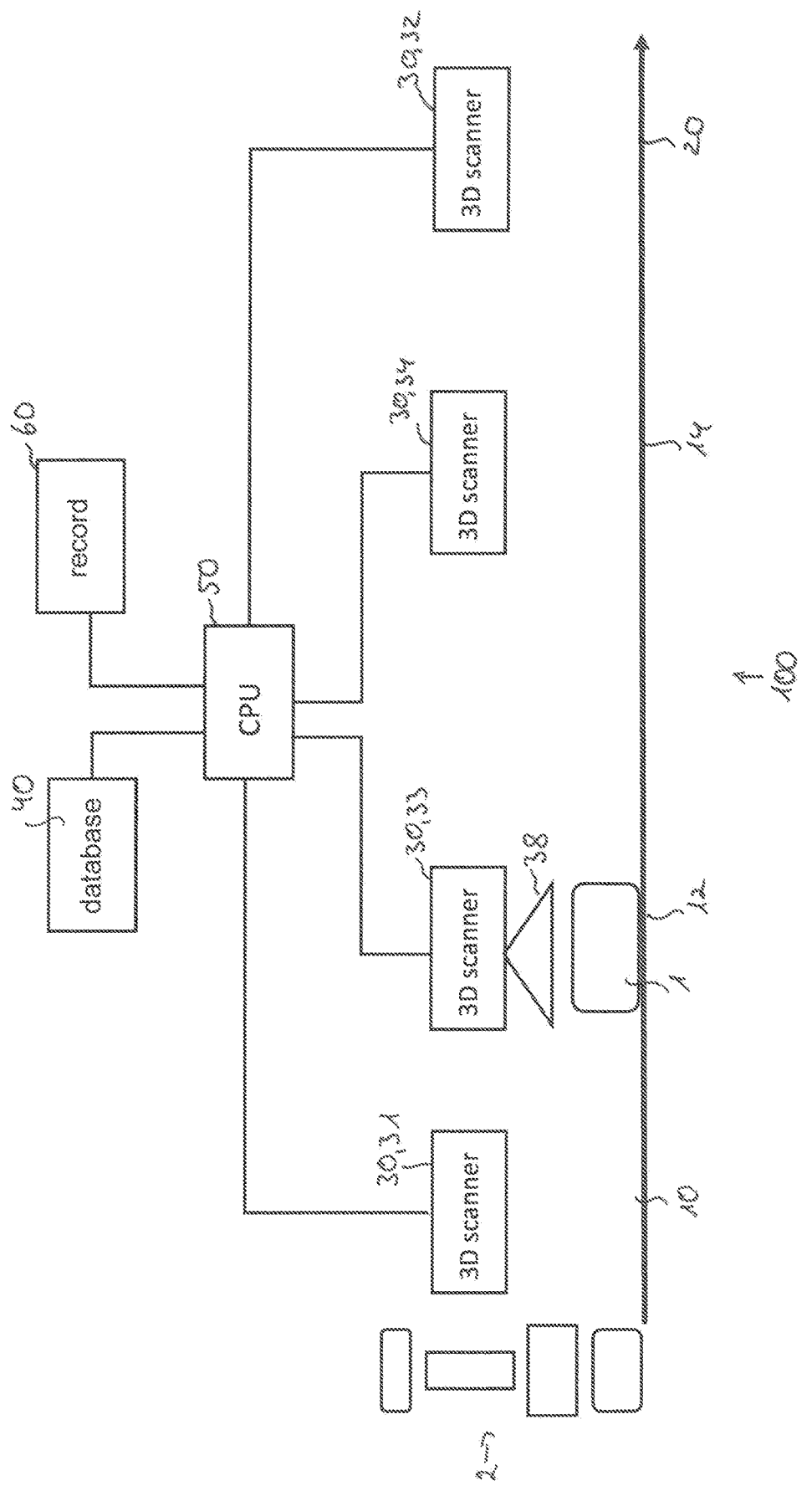
FIG. 1 is a schematic block diagram of an embodiment of a system for tracking an object according to the present invention.

FIG. 1 is a schematic block diagram of an embodiment of a system for tracking an object according to the present invention. A shipping object 1 of a stock of objects 2 is shipped from a first location 10 (start) to a second location 20 along a transport path 100. The system includes a 3D scanning system 30 comprising four 3D scanners 31, 32, 33 and 34. The first 3D scanner 31 is arranged at the first location 10, the second 3D scanner 32 is located at the second location 20. The third 3D scanner 33 is located at a first intermediate location 12 and the fourth 3D scanner 34 is located at a second intermediate location 14, wherein first and second intermediate locations 12, 14 are located between the first location 10 and the second location 20 along the transport path 100.

The 3D scanners 31, 32, 33, 34 are operative to perform a 3D scan of the object 1 passing the location where the respective 3D scanner 31, 32, 33, 34 is arranged. In FIG. 1, the shipping object 1 has reached the first intermediate location 12 and the third 3D scanner 33 performs a 3D scan 38 of the shipping object 1. The 3D scanners 31, 32, 33, 34 of the 3D scanning system 30 are operative to create for each of the plurality of locations 10, 12, 14, 20 a scanned 3D point cloud of at least a region of an outer surface of the shipping object 1. In the scenario shown in FIG. 1, a 3D point cloud of the upper portion and the lateral portions of the outer surface of the shipping object 1 located at the first intermediate location 14 is created.

The system further comprises a database 40. The database comprises a database structure, wherein for each object of the stock 2 a content-based descriptor of a 3D point cloud representation of the object is attributed to the object. The database structure may contain, for each object of the stock, metadata identifying the object, e.g. a product name, and data representing the content-based descriptor. The content-based descriptor is derived by a predefined descriptor algorithm which is applied to the 3D point cloud representation of each object of the stock. The descriptor algorithm is executed on a CPU 50 which is in communication with the database 40.

The descriptor algorithm is also executed on the CPU 50 to derive a scanned content-based descriptor associated with the respective location (in FIG. 1: the first intermediate location 12) from the scanned 3D point cloud associated with the respective location (in FIG. 1: the first intermediate location 12). To this end, the 3D scanners 31, 32, 33, 34 of the 3D scanning system are in communication with the CPU 50. Once the scanned content-based descriptor associated with the respective location (in FIG. 1: the first intermediate location 12) is derived, a similarity search is performed between the scanned content-based descriptor and the content-based descriptors in the database 40 in accordance with a similarity search algorithm which is executed by the CPU.

The result of the similarity search is then recorded in a record 60. The record may be a file stored in memory means.

FIG. 2 is an illustration of a flow chart of the method according to an embodiment of the present invention. At S1, a database structure is provided, wherein for each object of the stock a content-based descriptor of a 3D point cloud representation of the object is attributed to the object, the content-based descriptor being derived by a predefined descriptor algorithm. According to the flow chart depicted in FIG. 2, the database is created before the shipment of the objects is started (S2). Alternatively, the database may be created at or after the start of the shipment of the objects. For example, in the embodiment of the invention depicted in FIG. 1, the 3D scanner 32 located at the first location 10 may be used to create a 3D point cloud representation of each shipping object at the first location 10. Then, a predefined descriptor algorithm may be executed to derive a content-based descriptor for each object. The content-based descriptor may then be stored in the database together with information identifying the respective shipping object, e.g. a product name.

Whenever a shipping object is passing the location where a 3D scanning system can be applied to the shipping object (e.g. in the embodiment of FIG. 1, this corresponds to the locations 10, 12, 14, 20 where the 3D scanners 31, 32, 33, 34 are arranged), the 3D scanning system is applied to the shipping object (S3, S4) to obtain a scanned 3D point cloud representation of the respective object at the respective location (S5). Then, the descriptor algorithm also used at S1 is applied to the scanned 3D point cloud. The result of this application is a scanned content-based descriptor (S6).

Next, a similarity search for the scanned content-based descriptor is performed (S7). To this end, a similarity search algorithm is applied to find a content-based descriptor in the database structure which is similar to the scanned content-based descriptor within some norm. The content-based descriptors may be in the form of a multidimensional feature vector and the norm may be a modified Euclidean distance defined by the equation:

$$d_2^S(f,f') = \sqrt{\Sigma_{i=1}^N \Sigma_{j=1}^N s_{ij}(f_i - f'_i)(f_j - f'_j)},$$

wherein $f_i$ and $f'_i$ are the components of the feature vectors f and f', and $s_{ij}$ are the matrix elements of S which is a positive definite N×N matrix.

The results of the similarity search may be one or several content-based descriptors in the database structure for which the norm is minimal or is below a preset threshold. Since each content-based descriptor in the database structure is attributed to an object in the stock, this may allow to establish a relationship between the shipping object and one or several objects of the stock. I.e., the shipping object scanned by one of the 3D scanners may be identified with one of the objects of the stock.

Furthermore, the result of the similarity search may be information whether the object is damaged.

The result of the descriptor algorithm is recorded (S8). The record may be provided in the form of a datafile. For each shipping object, the datafile may contain metadata identifying the shipping object, e.g. a product name, the location of the application of the respective 3D scanner, a time stamp indicating when the 3D scanner was applied and information whether the scanned object was damaged. For example, for the embodiment shown in FIG. 1 the record may be of the form (object=product name, location=first location, time=1 pm, no damage; object=product name, location=first intermediate location, time=1.30 pm, no damage). When the object arrives at the second intermediate location 14, this record may be updated, e.g. (object=product name, location=first location, time=1 pm, no damage; object=product name, location=first intermediate location, time=1.30 pm, no damage; object=product name, location=second intermediate location, time=1.45 pm, damage). Then, it is clear that the damage must have occurred between the first intermediate location 12 and the second intermediate location 14. If the object 1 never arrives at the second intermediate location 14, there will be no entry in the datafile of the form (object=product name, location=second intermediate location, time=$t_3$). Then, it is clear that the object was lost between the first intermediate location and the second intermediate location.

The method continues until the shipment of all objects to be shipped is completed (S9).

What is claimed is:

1. A method of tracking an object being shipped, the object moving along a transport path from a first location to a second location that is distant from the first location, the object selected from a stock of objects, the method comprising the steps of:

providing a database structure containing, for each object in the stock of objects, a content-based descriptor of a three-dimensional ("3D") point cloud representation attributed to the object, each content-based descriptor derived by a predefined descriptor algorithm;

creating, for each of a plurality of locations along the transport path, a scanned 3D point cloud of at least a region of an outer surface of the object being shipped, by scanning the object being shipped with a three-dimensional ("3D") scanning system at each of the locations, the three-dimensional scanning system;

deriving a scanned content-based descriptor for the object being shipped at each of the locations by applying the descriptor algorithm to each of the scanned 3D point clouds;

performing a similarity search, for each of the locations, by comparing the scanned content-based descriptor associated with the location to the content-based descriptors in the database structure, using a predefined similarity search algorithm; and maintaining a record of a result of each performed similarity search for each of the plurality of locations along the transport path.

2. The method of claim 1, wherein:
the object being shipped is scanned from a plurality of different directions by each 3D scanning system; and
creating each 3D point cloud comprises:
creating, for each of the plurality of scans, a first 3D point cloud;
extracting a feature, for each of the first 3D point clouds, using a predefined extraction algorithm, and
using the extracted features of the first 3D point clouds for registration of the scanned 3D point cloud of the object being shipped, using a predefined registration algorithm.

3. The method of claim 2, wherein:
the similarity search algorithm computes a distance between the scanned content-based descriptor and the content-based descriptors in the database structure using a predefined metric.

4. The method of claim 1, wherein the result of the similarity search comprises information about whether the object being shipped corresponds to one of the objects of the stock.

5. The method of claim 1, wherein the result of the similarity search comprises information about whether the object being shipped is damaged.

6. The method of claim 1, wherein the maintained records of the results of the similarity search comprise time and location of the 3D scanning system providing the 3D point cloud.

7. The method of claim 6, wherein the maintained records of the results of the similarity search comprise information about whether the object being shipped is damaged.

8. The method of claim 1, wherein the content-based descriptor is based on a geometric feature of the 3D point cloud.

9. The method of claim 1, further comprising:
classifying the 3D point cloud representations of at least one of: the objects of the stock and the scanned 3D point clouds.

10. The method of claim 9, wherein the artificial intelligence used is a convolutional neural network.

11. The method of claim 3, wherein the maintained records of the results of the similarity search comprise time and location of the 3D scanning system providing the 3D point cloud.

12. The method of claim 3, further comprising:
classifying the 3D point cloud representations of at least one of: the objects of the stock and the scanned 3D point clouds.

13. An apparatus for tracking an object being shipped, the object moving along a transport path from a first location to a second location that is distant from the first location, the object selected from a stock of objects, the apparatus comprising:

a database comprising a database structure in which each object in the stock of objects has a content-based descriptor of a 3D point cloud representation attributed thereto, the content-based descriptor being derived by a predefined descriptor algorithm;

a 3D scanning system, applicable to the object being shipped at each of a plurality of locations along the transport path, the 3D scanning system operative to create, for each of the plurality of locations, a scanned 3D point cloud of at least a region of an outer surface of the object being shipped;

a data processor, in communication with both the database and the 3D scanning system, configured to:
    apply the descriptor algorithm to each of the scanned 3D point clouds to derive a scanned content-based descriptor associated with the respective location; and
    perform, for each of the plurality of locations, a similarity search between the scanned content-based descriptor associated with the respective location and the content-based descriptors in the database structure, using a predefined similarity search algorithm, and
means for maintaining a record of the results of the similarity search for each of the plurality of locations along the transport path.

14. The apparatus of claim 13, wherein the three-dimensional scanning system comprises a light detection and ranging ("LIDAR") system.

15. The apparatus of claim 13, further comprising:
a conveyor belt or a forklift that moved the object being shipped along the transport path.

16. A non-transitory computer-readable medium having stored thereon a computer program for tracking an object being shipped, selected from a stock of objects, along a transport path from a first location to a second location that is distant from the first location, the computer program comprising instructions that, when executed by a computer, cause the computer to carry out the following steps:
    providing a database structure containing, for each object in the stock of objects, a content-based descriptor of a three-dimensional ("3D") point cloud representation attributed to the object, each content-based descriptor derived by a predefined descriptor algorithm;
    creating, for each of a plurality of locations along the transport path, a scanned 3D point cloud of at least a region of an outer surface of the object being shipped, by retrieving scanning data obtained by applying a 3D scanning system to the object being shipped at each of a plurality of locations along the transport path;
    deriving a scanned content-based descriptor for the object being shipped at each of the locations by applying the descriptor algorithm to each of the scanned 3D point clouds;
    performing a similarity search, for each of the locations, by comparing the scanned content-based descriptor associated with the location to the content-based descriptors in the database structure, using a predefined similarity search algorithm; and
    maintaining a record of a result of each performed similarity search for each of the plurality of locations along the transport path.

* * * * *

UNITED STATES PATENT AND TRADEMARK OFFICE
CERTIFICATE OF CORRECTION

PATENT NO. : 12,020,199 B2
APPLICATION NO. : 17/303237
DATED : June 25, 2024
INVENTOR(S) : Shahzad et al.

Page 1 of 1

It is certified that error appears in the above-identified patent and that said Letters Patent is hereby corrected as shown below:

In the Specification

In Column 8, Line 66, delete "$d_2^S(f,f) = \sqrt{\Sigma_{i=1}^N \Sigma_{j=1}^N s_{ij}(f_i - f'_i)(f_j - f'_j)}$," and insert -- $d_2^S(f,f') = \sqrt{\Sigma_{i=1}^N \Sigma_{j=1}^N s_{ij}(f_i - f'_i)(f_j - f'_j)}$, --.

Signed and Sealed this
Third Day of September, 2024

Katherine Kelly Vidal
*Director of the United States Patent and Trademark Office*